US00RE48571E

(19) United States
(12) Reissued Patent
Zhang et al.

(10) Patent Number: US RE48,571 E
(45) Date of Reissued Patent: May 25, 2021

(54) DOWNLINK DATA TRANSMISSION METHOD, BASE STATION, AND SERVING GATEWAY ON LTE NETWORK

(71) Applicant: Huawei Technologies Co., Ltd., Shenzhen (CN)

(72) Inventors: Lixue Zhang, Beijing (CN); Xiaolong Guo, Beijing (CN)

(73) Assignee: Huawei Technologies Co., Ltd., Shenzhen (CN)

(21) Appl. No.: 16/103,694

(22) Filed: Aug. 14, 2018

Related U.S. Patent Documents

Reissue of:
(64) Patent No.: 9,420,622
Issued: Aug. 16, 2016
Appl. No.: 14/576,643
Filed: Dec. 19, 2014

U.S. Applications:
(63) Continuation of application No. PCT/CN2012/077759, filed on Jun. 28, 2012.

(51) Int. Cl.
*H04W 68/00* (2009.01)
*H04W 76/20* (2018.01)
*H04W 76/19* (2018.01)

(52) U.S. Cl.
CPC ..... *H04W 76/20* (2018.02); *H04W 76/19* (2018.02); *H04W 68/005* (2013.01)

(58) Field of Classification Search
CPC .... H04W 76/20; H04W 76/19; H04W 68/005
See application file for complete search history.

(56) References Cited

U.S. PATENT DOCUMENTS 8,375,245 B2 * 2/2013 Chang ..... G06F 11/0709 370/221
8,565,689 B1 * 10/2013 Rubin ..... H04B 17/382 455/67.11
8,929,338 B2 * 1/2015 Sun ..... H04W 52/0235 370/311
2009/0239526 A1 * 9/2009 Zhao ..... H04W 60/06 455/424

(Continued)

FOREIGN PATENT DOCUMENTS

CN 101047957 A 10/2007
CN 101136835 A 3/2008

OTHER PUBLICATIONS

IP Wireless Inc., "On Retaining RRC Context," 3GPP TSG RAN WG2 Meeting #77b, R2-121550, Juju, Korea, Mar. 26-30, 2012, 8 pages.

(Continued)

*Primary Examiner* — Ovidio Escalante
(74) *Attorney, Agent, or Firm* — Slater Matsil, LLP

(57) ABSTRACT

The present invention provides a downlink data transmission method, base station, and serving gateway on an LTE network. The method includes: learning, by an eNB, that a UE needs to be paged, when an S1 bearer is retained and a radio bearer is released; paging, by the eNB, the UE and re-establishing a radio bearer between the eNB and the UE; and sending, by the eNB, downlink data, which is received from an S-GW, to the UE through the re-established radio bearer. Embodiments of the present invention can ensure correct transmission of downlink data, and avoid data loss.

25 Claims, 6 Drawing Sheets

(56) References Cited

U.S. PATENT DOCUMENTS

2010/0081459 A1* 4/2010 Bosch ..... H04L 9/0833 455/458
2010/0135206 A1* 6/2010 Cherian ..... H04W 36/0066 370/328
2010/0178941 A1* 7/2010 Chun ..... H04L 1/1832 455/458
2011/0194433 A1 8/2011 Song et al.
2011/0242965 A1* 10/2011 Strzyz ..... H04W 36/06 370/216
2012/0144226 A1* 6/2012 Yang ..... H04L 41/5038 714/2
2012/0275401 A1* 11/2012 Sun ..... H04W 76/18 370/329
2013/0015953 A1* 1/2013 Hsu ..... H04W 4/08 340/7.46
2013/0039287 A1* 2/2013 Rayavarapu ..... H04W 68/005 370/329
2013/0155954 A1* 6/2013 Wang ..... H04W 4/70 370/328
2014/0373124 A1* 12/2014 Rubin ..... H04L 67/28 370/230
2015/0173121 A1* 6/2015 Miklos ..... H04W 76/38 370/329
2015/0382320 A1* 12/2015 Rune ..... H04W 4/20 455/426.1

OTHER PUBLICATIONS

Huawei, "Discussion of Network Triggered Service Request," 3GPP TSG SA WG2 Architecture—S2#58, S2-072561, Orlando, Fl, Jun. 25-29, 2007, 4 pages.

"3rd Generation Partnership Project; Technical Specification Group Radio Access Network; Radio Resource Control (RRC); Protocol Specification (Release 8)," 3GPP TS 25.331 V8.6.0 (Mar. 2009), 1,673 pages.

"3rd Generation Partnership Project; Technical Specification Group Radio Access Network; Evolved Universal Terrestrial Radio Access (E-UTRA); Radio Resource Control (RRC); Protocol specification (Release 10)," 3GPP TS 36.331 V10.5.0; (Mar. 2012); 302 pages.

"3rd Generation Partnership Project; Technical Specification Group Radio Access Network; Evolved Universal Terrestrial Radio Access Network (E-UTRAN); S1 Application Protocol (S1AP) (Release 10)," NPL-3GPP TS 36.413 V10.5.0, (Mar. 2012), 255 pages.

Nokia, "Data Forwarding Mechanism Over X2 and S1 Interface," 3GPP TSG RAN WG3 Meeting #57, R3-071573, Athens, Greece, Aug. 20-24, 2007, 10 pages.

* cited by examiner

DOWNLINK DATA TRANSMISSION METHOD, BASE STATION, AND SERVING GATEWAY ON LTE NETWORK

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

This application is *a Reissue Application of patent application Ser. No. 14/576,643 filed on Dec. 19, 2014, issued as U.S. Pat. No. 9,420,622 filed on Aug. 16, 2016, which is* a continuation of International Application No. PCT/CN2012/077759, filed on Jun. 28, 2012[, which ]. *The International Application No. PCT/CN2012/077759,* is hereby incorporated by reference in its entirety.

TECHNICAL FIELD

The present invention relates to wireless communication technologies, and in particular, to a downlink data transmission method, base station, and serving gateway on a long term evolution (LTE) network.

BACKGROUND

If a user equipment (UE) needs to transmit data through an LTE network, a bearer needs to be established first. An end-to-end bearer of the LTE network is an evolved packet system (EPS) Bearer, and the EPS Bearer refers to an end-to-end data transmission bearer between a UE and a packet data network (PDN) gateway (P-GW). The EPS Bearer may be further divided into a radio bearer, an S1 Bearer, and an S5/S8 Bearer, where the Radio Bearer refers to a transmission bearer between a UE and a base station (e.g., eNB), the S1 Bearer refers to a UE specific bearer between an eNB and a serving gateway (S-GW) for a specific UE, the S5/S8 Bearer refers to a transmission bearer between an S-GW and a P-GW, and the Radio Bearer and the S1 Bearer are collectively referred to as an evolved radio access bearer (E-RAB) bearer.

After a UE starts up and registers with a network, the network establishes a default bearer for the UE, and after the UE returns to an idle state, the network releases an E-RAB bearer, that is, releases a Radio Bearer and an S1 Bearer. When the UE needs to transmit data, the network needs to establish the Radio Bearer and the S1 Bearer first and then modifies an S5/S8 Bearer, and after these operations are completed, the UE can transmit the data.

In some scenarios, for example, in an intelligent meter reading scenario, in order to improve the transmission efficiency, only the Radio Bearer may be released, and the S1 Bearer and the S5/S8 Bearer are retained, and at the same time, an eNB retains UE context. However, when downlink data is sent from the S-GW to the eNB, the downlink data cannot be sent to the UE because the Radio Bearer has been released, as a result, data loss occurs.

SUMMARY

The present invention provides a downlink data transmission method, base station, and serving gateway on an LTE network, to transmit downlink data to a UE, thereby avoiding data loss.

In one aspect, a downlink data transmission method on an LTE network is provided, including determining, by an eNB, that a UE needs to be paged, when an S1 bearer is retained and a radio bearer is released. The method further includes paging, by the eNB, the UE and re-establishing a radio bearer between the eNB and the UE; and sending, by the eNB, downlink data, which is received from an S-GW, to the UE through the re-established radio bearer.

In another aspect, a downlink data transmission method on an LTE network is provided, including determining, by an S-GW, that a radio bearer corresponding to an S1 bearer does not exist when downlink data is received and the S1 bearer is retained. The method further includes sending, by the S-GW, a downlink data notification to an MME, so that the MME sends a paging instruction to an eNB after receiving the downlink data notification, where the paging instruction is used to instruct the eNB to page a UE corresponding to the S1 bearer and re-establish a radio bearer between the eNB and the UE. The method further includes sending, by the S-GW, the downlink data to the UE through the S1 bearer and the re-established radio bearer.

In one aspect, an eNB is provided, including a learning module configured to learn that a UE needs to be paged when an S1 bearer is retained and a radio bearer is released. A processing module is configured to page the UE and re-establish a radio bearer between the eNB and the UE, after the learning module learns that the UE needs to be paged. A first sending module is configured to send, by the processing module, downlink data, which is received from an S-GW, to the UE through the radio bearer re-established.

In another aspect, an S-GW is provided, including a learning module configured to learn that a radio bearer corresponding to an S1 bearer does not exist, when downlink data is received and the S1 bearer is retained. A first sending module is configured to send a downlink data notification to an MME, when the learning module learns that the radio bearer corresponding to the S1 bearer does not exist, so that the MME sends a paging instruction to an eNB after receiving the downlink data notification, where the paging instruction is used to instruct the eNB to page a UE corresponding to the S1 bearer and re-establish a radio bearer between the eNB and the UE. A second sending module is configured to send the downlink data to the UE through the S1 bearer and the radio bearer whose re-establishment is triggered by the first sending module.

It can be known from the foregoing technical solutions, according to embodiments of the present invention, when the S1 bearer is retained and the radio bearer is released, the UE is paged and the radio bearer between the eNB and the UE is re-established, so that the downlink data can be sent to the UE, thereby avoiding data loss.

BRIEF DESCRIPTION OF THE DRAWINGS

To illustrate the technical solutions in the embodiments of the present invention more clearly, the following briefly introduces the accompanying drawings required for describing the embodiments. Apparently, the accompanying drawings in the following description show some embodiments of the present invention, and a person of ordinary skill in the art may still derive other drawings from these accompanying drawings without creative efforts.

DETAILED DESCRIPTION OF ILLUSTRATIVE EMBODIMENTS

To make the objectives, technical solutions, and advantages of the embodiments of the present invention more comprehensible, the following clearly and describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

In a scenario where a radio bearer is released and an S1 bearer is retained, after a UE enters an idle state (RRC_IDLE), a state of the UE that is stored in an MME is a connected state (ECM_ CONNECTED) because the S1 bearer is not released. After downlink data reaches an S-GW, the S-GW sends the downlink data to an eNB through the S1 bearer. However, because a radio bearer between the eNB and the UE has been released and in the MME, the state of the UE is the connected state, the MME does not page the UE, so that the downlink data is discarded by the eNB and fails to be transmitted to the UE. In order to ensure that the downlink data is transmitted to the UE in the scenario where the S1 bearer is retained and the radio bearer is released, the present invention provides the following embodiments.

Figure 1:
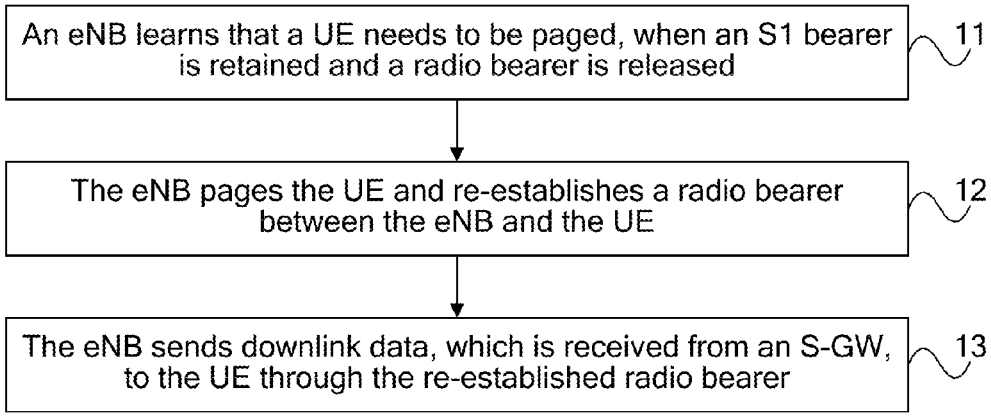
FIG. 1 is a schematic flowchart of an embodiment of a downlink data transmission method on an LTE network according to the present invention.

FIG. 1 is a schematic flowchart of an embodiment of a downlink data transmission method on an LTE network according to the present invention, which includes the following steps.

Step 11: An eNB learns that a UE needs to be paged, when an S1 bearer is retained and a radio bearer is released.

After receiving downlink data sent by an S-GW through the S1 bearer, the eNB may learn that the UE needs to be paged, if the eNB determines that a radio bearer corresponding to the S1 bearer does not exist. Alternatively, the eNB may also learn that the UE needs to be paged after receiving a paging instruction sent by an MME.

Step 12: The eNB pages the UE and re-establishes a radio bearer between the eNB and the UE.

After paging the UE, the eNB may re-establish the radio bearer with the UE, and then send the downlink data from the S-GW to the UE through the re-established radio bearer and the existing S1 bearer.

Step 13: The eNB sends downlink data, which is received from an S-GW, to the UE through the re-established radio bearer.

According to this embodiment, the eNB pages the UE and re-establishes the radio bearer, so that it can be ensured that the downlink data is sent to the UE.

Figure 2:
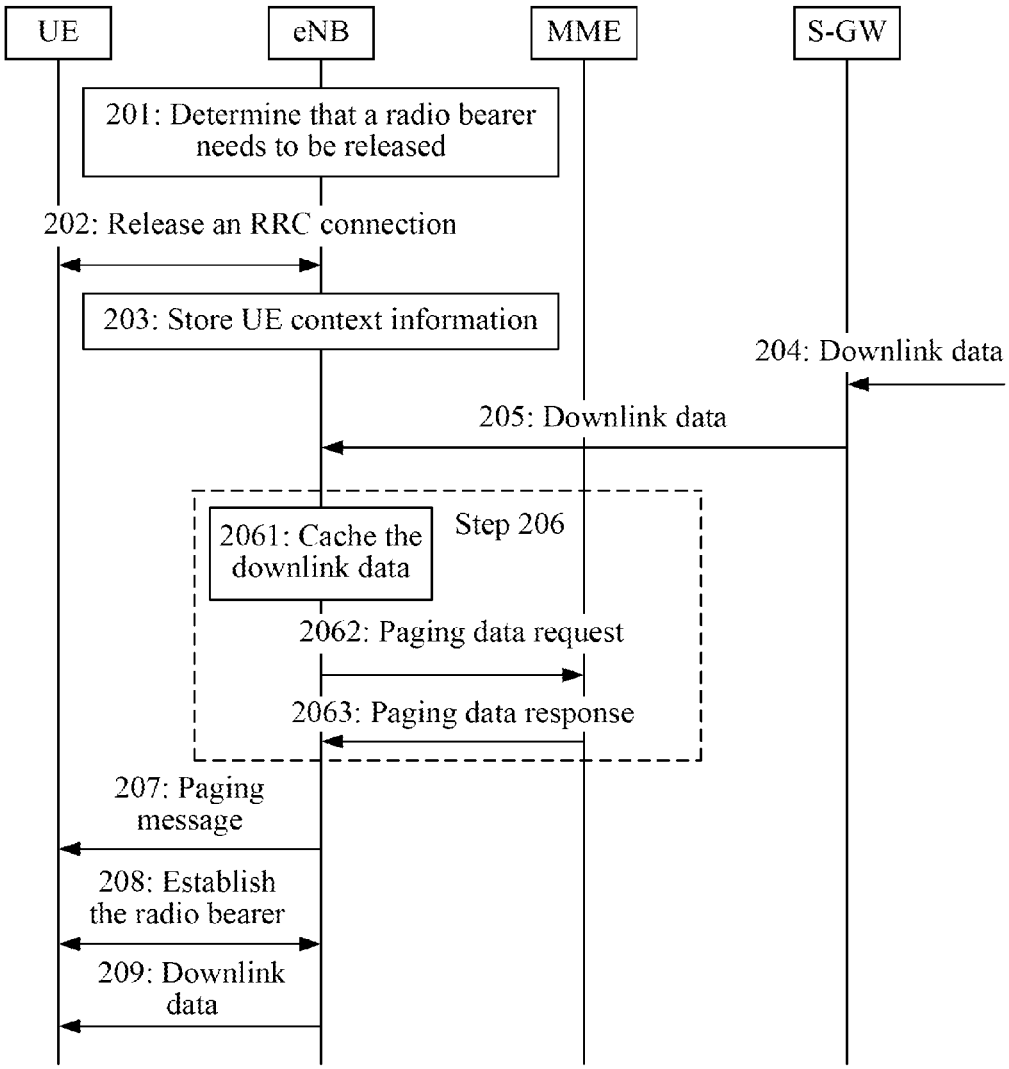
FIG. 2 is a schematic flowchart of another embodiment of a downlink data transmission method on an LTE network according to the present invention.

FIG. 2 is a schematic flowchart of another embodiment of a downlink data transmission method on an LTE network according to the present invention, which includes the following steps.

Step 201: An eNB determines that a radio bearer needs to be released.

For example, the eNB may set a keepalive clock, and may determine that the radio bearer needs to be released, after the keepalive clock expires.

Step 202: The eNB releases a radio resource control (RRC) connection to the UE.

Step 203: The eNB stores UE context information.

The keepalive clock may be set in the eNB, and when it is detected that a duration without data transmission of the UE reaches a duration set by the keepalive clock, it indicates that the keepalive clock expires (inactivity timer expires).

In this embodiment, only the radio bearer is released, and the eNB does not request an MME to release an S1 bearer, and therefore, the S1 bearer and an S5/S8 bearer are still retained. At the same time, the eNB stores UE context and configuration information about a signaling radio bearer (SRB) and a data radio bearer (DRB) that are established last time, so that the radio bearer can be quickly established and correspond to the S1 bearer during subsequent UE access.

Step 204: Downlink data reaches an S-GW.

Step 205: The S-GW sends the downlink data to the eNB through an S1 bearer.

Step 206: The eNB caches the downlink data, and obtains paging data after determining that a radio bearer corresponding to the S1 bearer does not exist.

The stored UE context information may be first searched for, and if the UE context information includes the paging data, the paging data may be obtained from the UE context information. Alternatively, if the UE context information does not include the paging data, the eNB may obtain the paging data from a mobility management entity (MME).

In this embodiment, an example where the paging data is obtained from the MME is taken, so that step 206 may specifically include the following steps.

Step 2061: The eNB caches the downlink data.

Step 2062: The eNB sends a paging data request to the MME, where the paging data request includes information of the UE.

Step 2063: After receiving the paging data request, the MME includes the paging data of the corresponding UE in a paging data response and sends the response to the eNB.

In addition, the S1 bearer includes the information of the UE, and the UE context information corresponding to the UE that needs to be searched for may be determined according to the information of the UE.

The paging data includes: a UE identity index value; a UE identity, where the UE identity may be an international mobile subscriber identity (IMSI) or a system architecture evolution-temporary mobile subscriber identity (S-TMSI) of the UE; and optionally, the paging data may further include: a UE specific discontinuous reception (DRX) numerical value (UE Specific DRX).

Step 207: The eNB sends a paging message to the UE, to initiate paging to the UE, where the paging is performed under only one eNB.

Step 208: The UE establishes the radio bearer under the eNB after receiving the paging message.

When the RRC connection is released in step 202, the eNB may send, to the UE, an instruction for the eNB to store the UE context information, and when the UE establishes the radio bearer, the UE may establish the radio bearer by using a process corresponding to the stored UE context information, where the process of establishing the radio bearer is quick. The radio bearer of the UE can be quickly established and has a one-to-one mapping relationship with the S1 bearer because the UE context information is stored in the eNB.

Step 209: The eNB sends the cached downlink data to the UE through the radio bearer.

In this embodiment, the eNB can obtain the paging data when determining that the radio bearer does not exist, and initiate the paging to the UE, to trigger establishing of the radio bearer, thereby ensuring that the downlink data can be sent to the UE.

Figure 3:
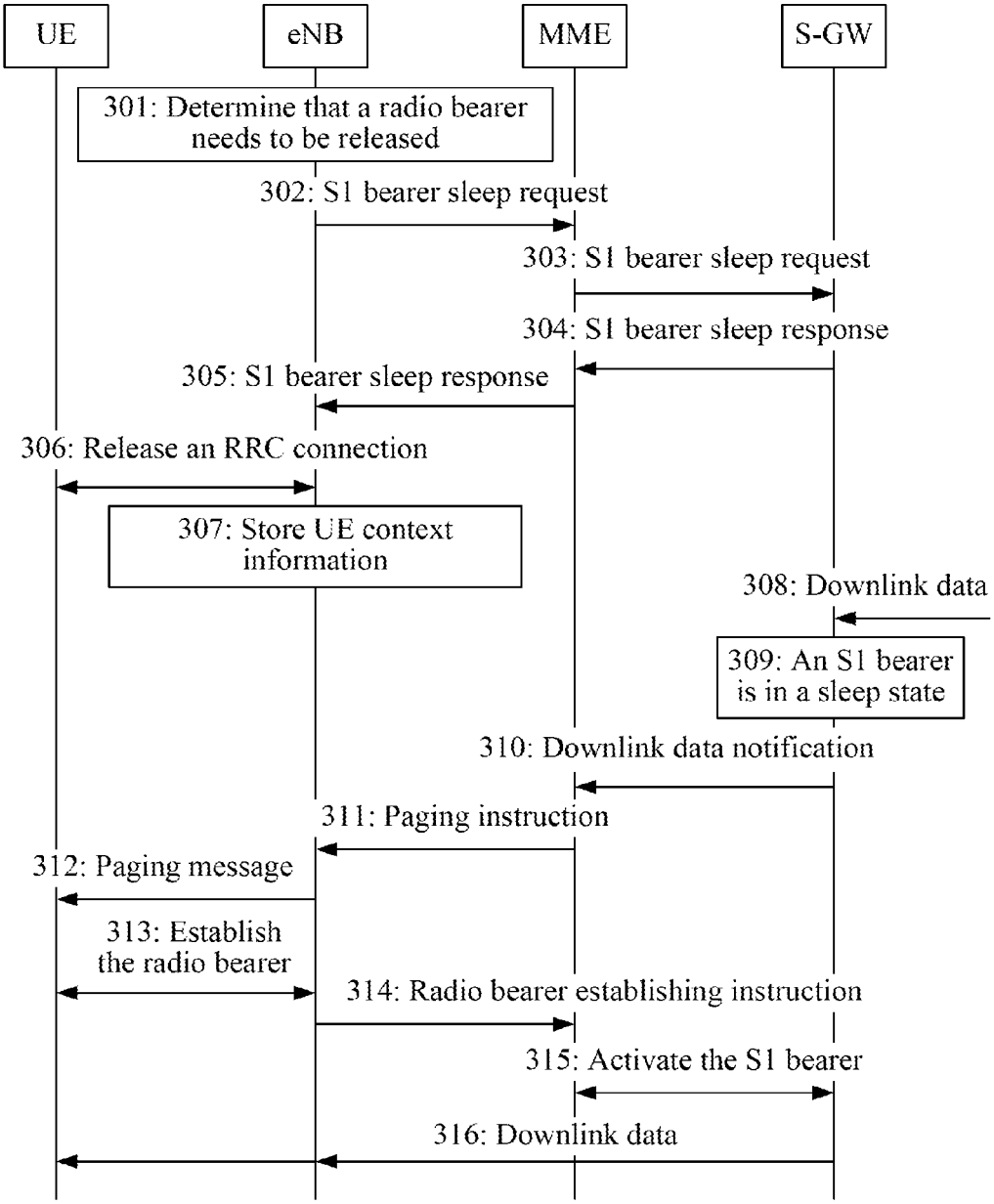
FIG. 3 is a schematic flowchart of another embodiment of a downlink data transmission method on an LTE network according to the present invention.

FIG. 3 is a schematic flowchart of another embodiment of a downlink data transmission method on an LTE network according to the present invention, which includes the following steps.

Step 301: An eNB determines that a radio bearer needs to be released.

For specific content, reference may be made to step 201.

Step 302: The eNB sends an S1 bearer sleep request to an MME.

Step 303: The MME sends the S1 bearer sleep request to an S-GW.

Step 304: The S-GW sets an S1 bearer to a sleep state, and sends an S1 bearer sleep response to the MME.

Step 305: The MME sends the S1 bearer sleep response to the eNB.

The foregoing S1 bearer sleep request and S1 bearer sleep response may be existing signaling or added signaling.

The S1 bearer being in the sleep state refers to that after downlink data reaches the S-GW, the S1 bearer exists but the S-GW fails to send the downlink data to the eNB; and the downlink data can be sent from the S-GW to the eNB through the S1 bearer only when the S1 bearer is in an activated state. The S1 bearer may be activated by the MME or uplink data.

In addition, for the uplink data, when the S1 bearer is in the sleep state, the eNB is also capable of sending the uplink data to the S-GW, and the S-GW activates the S1 bearer after receiving the uplink data.

Step 306: The eNB releases an RRC connection to a UE.

Step 307: The eNB stores UE context information.

For specific content of step 301, step 306, and step 307, reference may be made to steps 201 to 203.

Step 308: Downlink data reaches the S-GW.

Step 309: The S-GW caches the downlink data after determining that the S1 bearer of the UE is in the sleep state.

Step 310: The S-GW sends a downlink data notification to the MME.

Step 311: The MME sends a paging instruction to the eNB.

Step 312: The eNB sends a paging message to the UE, to initiate paging to the UE.

The paging instruction sent by the MME may include paging data of the UE, and the eNB initiates the paging according to the paging data.

Step 313: The UE establishes the radio bearer with the eNB.

When the RRC connection is released, signaling sent by the eNB to the UE may also carry an instruction for the eNB to store the UE context information, so that the radio bearer can be quickly established.

Step 314: The eNB sends a radio bearer establishing instruction to the MME.

The instruction may be carried in added signaling or existing signaling, for example, "Radio Bearer Setup Indication" is carried in an existing service request.

Step 315: The MME instructs the S-GW to activate the S1 bearer.

The instruction for activating the S1 bearer may be also carried in separately defined signaling or existing signaling, for example, bearer modification signaling.

Step 316: The S-GW sends the downlink data to the eNB through the activated S1 bearer, and the eNB sends the downlink data to the UE through the established radio bearer.

Figure 4:
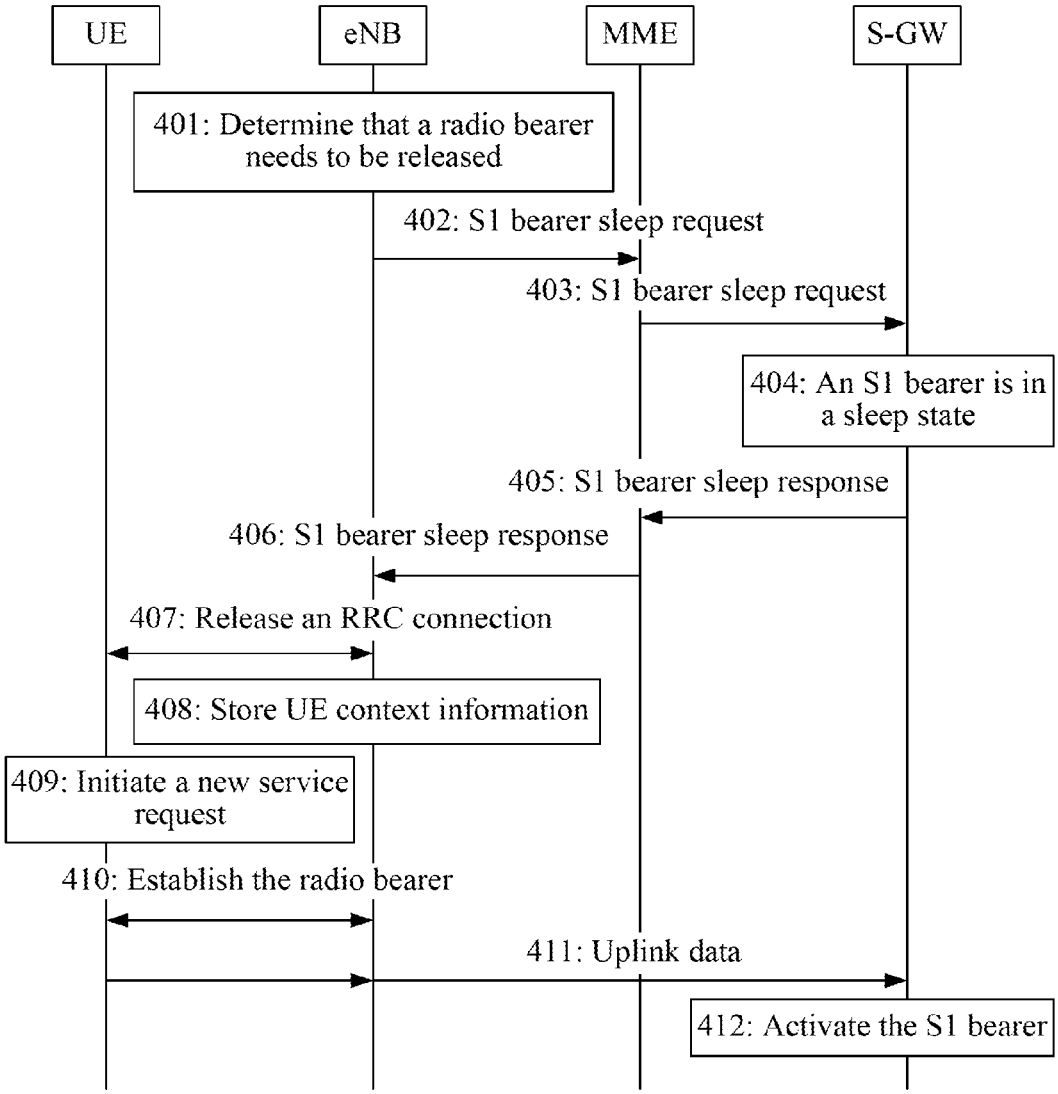
FIG. 4 is a schematic flowchart of activating an S1 bearer through uplink data according to the present invention.

In addition, in this embodiment, when the S1 bearer is in the sleep state, the S1 bearer may be also activated through the uplink data, as shown in FIG. 4, which includes:

Step 401: An eNB determines that a radio bearer needs to be released.

Step 402: The eNB sends an S1 bearer sleep request to an MME.

Step 403: The MME sends the S1 bearer sleep request to an S-GW.

Step 404: The S-GW sets an S1 bearer to a sleep state.

Step 405: The S-GW sends an S1 bearer sleep response to the MME.

Step 406: The MME sends the S1 bearer sleep response to the eNB.

Step 407: The eNB releases an RRC connection to a UE.

Step 408: The eNB stores UE context information.

Step 409: The UE initiates a new service request.

Step 410: The UE establishes the radio bearer with the eNB.

Step 411: The UE sends uplink data to the S-GW through the eNB. The UE may send the uplink data to the eNB through the re-established radio bearer, and the eNB sends the uplink data to the S-GW through the S1 bearer.

Step 412: The S-GW activates the S1 bearer in the sleep state.

According to this embodiment, the S1 bearer is set to the sleep state when the radio bearer is released, and after the S-GW receives the downlink data, if the S1 bearer is in the sleep state, the S-GW initiates the paging according to that the UE is in an idle state, and then the radio bearer can be re-established, thereby ensuring that the downlink data is sent to the UE.

Figure 5:
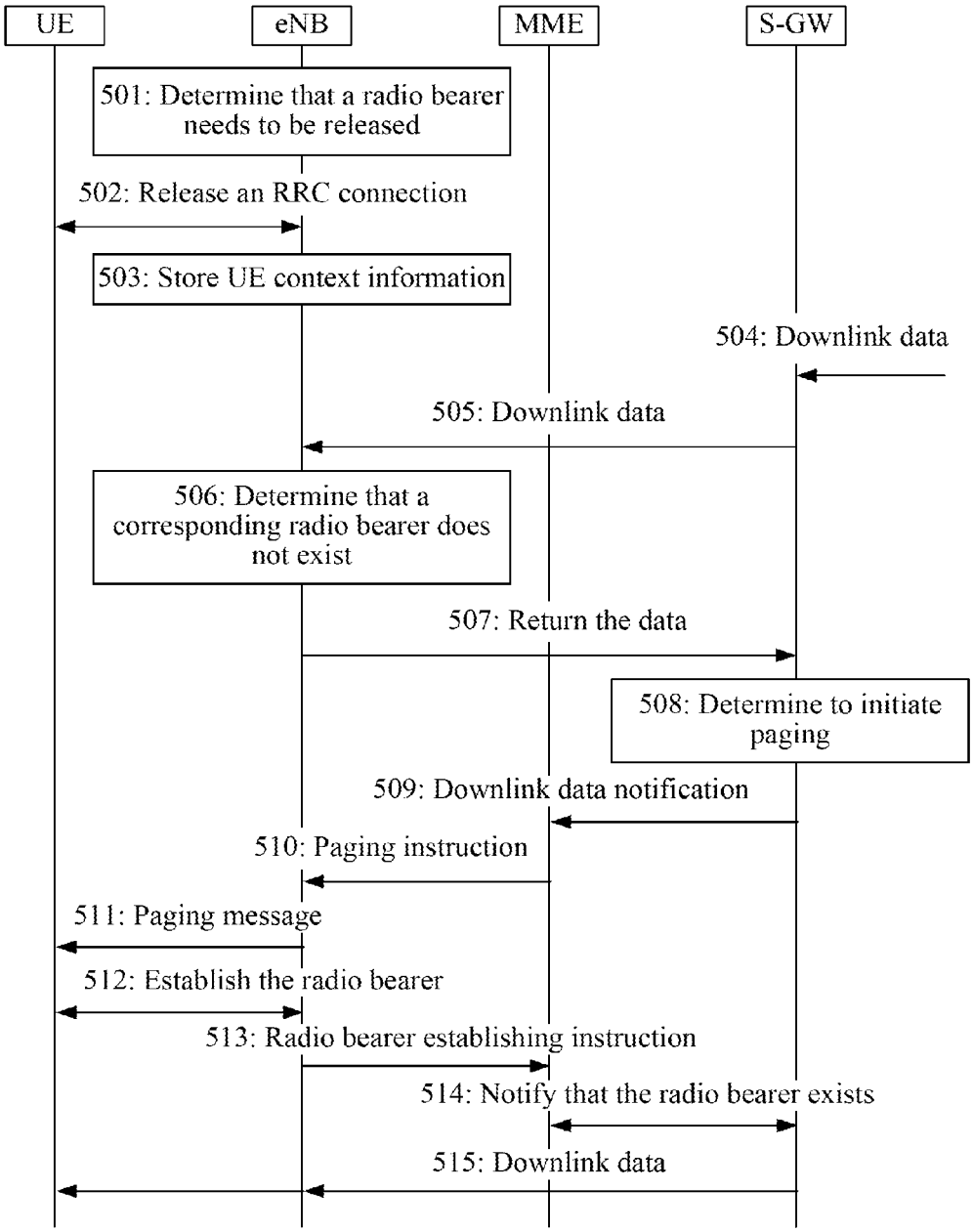
FIG. 5 is a schematic flowchart of another embodiment of a downlink data transmission method on an LTE network according to the present invention.

FIG. 5 is a schematic flowchart of another embodiment of a downlink data transmission method on an LTE network according to the present invention, which includes the following steps.

Step 501: An eNB determines that a radio bearer needs to be released.

Step 502: The eNB releases an RRC connection to a UE.

Step 503: The eNB stores UE context information.

For specific content of steps 501 to 503, reference may be made to steps 201 to 203.

Step 504: Downlink data reaches an S-GW.

Step 505: The S-GW sends the downlink data to the eNB through an S1 bearer. 5053 Step 506: The eNB determines that a radio bearer corresponding to the S1 bearer does not exist.

Step 507: The eNB returns the downlink data to the S-GW, and adds indication information to the returned downlink data, where the indication information is used to indicate that the radio bearer corresponding to the S1 bearer does not exist.

The indication information may be added to a GTP-U protocol header of a data packet of the downlink data, where the GTP-U protocol header may include an extension header, for example, a "next extension header type" indicates that the extension header is included, and the extension header may include the indication information, for example, the indication information is included in "extension header content" of the extension header.

Step 508: The S-GW parses the received downlink data, and determines, according to the indication information, that no corresponding radio bearer exists.

Step 509: The S-GW sends a downlink data notification to the MME.

Step 510: The MME sends a paging instruction to the eNB.

Step 511: The eNB sends a paging message to the UE, to initiate paging to the UE.

The paging instruction sent by the MME may include paging data of the UE, and the eNB initiates the paging according to the paging data.

Step 512: The UE establishes the radio bearer with the eNB.

Step 513: The eNB sends a radio bearer establishing instruction to the MME.

Step 514: The MME notifies the S-GW that the radio bearer exists.

The MME may send the notification through added signaling or existing signaling, for example, the MME sends a bearer modification request to the S-GW, where the bearer modification request carries indication information indicating that the radio bearer exists; and after receiving the bearer modification request, the S-GW returns a corresponding bearer modification response to the MME.

Step 515: The S-GW sends the downlink data to the eNB through the S1 bearer, and the eNB sends the downlink data to the UE through the established radio bearer.

According to this embodiment, after determining that no corresponding radio bearer exists, the eNB returns the downlink data to the S-GW, and carries the indication information indicating that no radio bearer exists, so that after receiving the returned downlink data, the S-GW initiates the paging according to that the UE is in an idle state, and then the radio bearer can be re-established, thereby ensuring that the downlink data is sent to the UE.

Figure 6:
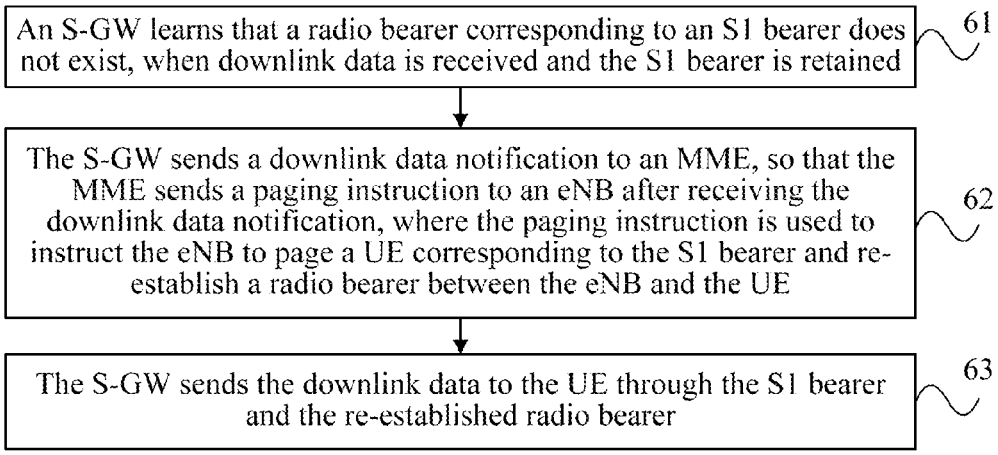
FIG. 6 is a schematic flowchart of another embodiment of a downlink data transmission method on an LTE network according to the present invention.

FIG. 6 is a schematic flowchart of another embodiment of a downlink data transmission method on an LTE network according to the present invention, which includes:

Step 61: An S-GW learns that a radio bearer corresponding to an S1 bearer does not exist, when downlink data is received and the S1 bearer is retained.

Step 62: The S-GW sends a downlink data notification to an MME, so that the MME sends a paging instruction to an eNB after receiving the downlink data notification, where the paging instruction is used to instruct the eNB to page a UE corresponding to the S1 bearer and re-establish a radio bearer between the eNB and the UE.

Step 63: The S-GW sends the downlink data to the UE through the S1 bearer and the re-established radio bearer.

Optionally, when the S-GW receives the downlink data, the S-GW may learn that the radio bearer corresponding to the S1 bearer does not exist, if determining that the S1 bearer is in a sleep state. At this time, the method may further include:

The S-GW receives an S1 bearer sleep request sent by the MME, and sets the S1 bearer to a sleep state, where the S1 bearer sleep request is sent by the MME after the MME receives the S1 bearer sleep request sent by the eNB, where the S1 bearer sleep request sent by the eNB is sent by the eNB after the eNB determines that the radio bearer needs to be released; and the sleep state refers to that after the downlink data reaches the S-GW, the S1 bearer exists but the downlink data fails to be sent to the eNB, and the sleep state is activated by the MME or is activated after uplink data sent by the eNB is received. The eNB may send the foregoing S1 bearer sleep request after a keepalive clock expires.

Correspondingly, the downlink data may be sent to the UE in the following manners The method includes receiving, by the S-GW, an activation instruction sent by the MME. The activation instruction is sent by the MME after the MME receives a radio bearer establishing instruction sent by the eNB. The radio bearer establishing instruction is sent by the eNB after the eNB re-establishes the radio bearer. The method further includes activating, by the S-GW, the S1 bearer between the eNB and the S-GW according to the activation instruction, and sending, by the S-GW, the downlink data to the eNB through the activated S1 bearer, and sending the downlink data to the UE through the eNB and the re-established radio bearer.

Optionally, the S-GW may also learn that the radio bearer corresponding to the S1 bearer does not exist, after receiving the downlink data including indication information and returned by the eNB, where the indication information is used to indicate that the radio bearer corresponding to the S1 bearer does not exist, and the indication information is added to the returned downlink data after the eNB receives the downlink data sent by the S-GW and determines that the radio bearer does not exist.

Correspondingly, the method may further include: after receiving the indication information, stopping, by the S-GW, sending the downlink data to the eNB but continuing to receive uplink data sent by the eNB and putting the returned downlink data into a cache queue again according to a packet header indication of the downlink data.

According to this embodiment, when the S1 bearer is retained and the radio bearer is released, the UE is paged and the radio bearer between the eNB and the UE is re-established, so that the downlink data can be sent to the UE, thereby avoiding data loss.

Figure 7:
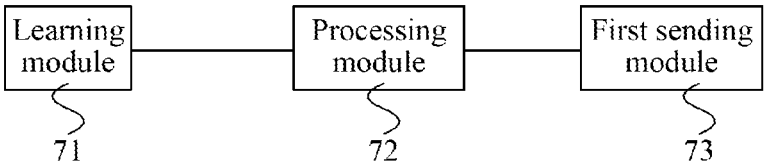
FIG. 7 is a schematic structural diagram of an embodiment of an eNB according to the present invention.

FIG. 7 is a schematic structural diagram of an embodiment of an eNB according to the present invention, which includes a learning module 71, a processing module 72, and a first sending module 73, where the learning module 71 is configured to learn that a UE needs to be paged, when an S1 bearer is retained and a radio bearer is released; the processing module 72 is configured to page the UE and re-establish a radio bearer between the eNB and the UE, after the learning module learns that the UE needs to be paged; and the first sending module 73 is configured to send downlink data, which is received from an S-GW, to the UE through the radio bearer re-established by the processing module.

Optionally, the learning module is configured to learn that the UE needs to be paged, when the S1 bearer is retained and the radio bearer is released. The processing module is configured to page the UE and re-establish the radio bearer between the eNB and the UE, after the learning module learns that the UE needs to be paged. The first sending module is configured to send the downlink data, which is received from the S-GW, to the UE through the radio bearer re-established by the processing module.

Optionally, the eNB may further include a receiving module configured to receive, through the S1 bearer, the downlink data sent by the S-GW. A caching module is configured to cache the downlink data received by the receiving module. The sending module is specifically configured to send the downlink data cached by the caching module to the UE through the re-established radio bearer.

Optionally, the processing module includes: a first unit, configured to page the UE, and a second unit, configured to re-establish the radio bearer. The first unit is specifically configured to search for stored UE context information, obtain paging data of the UE from the UE context information if the UE context information includes the paging data of the UE, obtain paging data of the UE from an MME if the UE context information does not include the paging data of the UE, and page the UE according to the paging data.

Optionally, the learning module is specifically configured to receive a paging instruction sent by an MME, where the paging instruction is sent by the MME after the MME receives a downlink data notification sent by the S-GW. The downlink data notification is sent by the S-GW when the S-GW receives the downlink data and learns that a radio bearer corresponding to the S1 bearer does not exist.

Optionally, the eNB further includes a second sending module configured to send an S1 bearer sleep request to the S-GW through the MME when it is determined that the radio bearer needs to be released, so that the S-GW sets the S1 bearer to a sleep state, and when the S-GW receives the downlink data, the S-GW learns that the radio bearer corresponding to the S1 bearer does not exist, if determining that the S1 bearer is in the sleep state. The sleep state refers to that after the downlink data reaches the S-GW, the S1 bearer exists but the downlink data fails to be sent to the eNB, and the sleep state is activated by the MME or is activated after uplink data sent by the eNB is received.

Optionally, the first sending module is specifically configured to send a radio bearer establishing instruction to the MME after the radio bearer is established, so that the MME activates the S1 bearer between the eNB and the S-GW after receiving the radio bearer establishing instruction. The first sending module is specifically configured to receive, through the activated S1 bearer, the downlink data sent by the S-GW, and send the downlink data to the UE through the re-established radio bearer.

Optionally, the eNB further includes a third sending module configured to add indication information to the downlink data and return the downlink data to which the indication information is added to the S-GW after the downlink data sent by the S-GW is received through the S1 bearer, if it is determined that the radio bearer corresponding to the S1 bearer does not exist. The indication information is used to indicate that the radio bearer corresponding to the S1 bearer does not exist, so that the S-GW learns, according to the indication information, that the radio bearer corresponding to the S1 bearer does not exist.

Optionally, the first sending module is specifically configured to send a radio bearer establishing instruction to the MME after the radio bearer is established, so that the MME sends indication information indicating that the radio bearer is established to the S-GW after the MME receives the radio bearer establishing instruction, and the S-GW learns that the radio bearer exists. The eNB receives, through the S1 bearer, the downlink data sent by the S-GW after the S-GW learns that the radio bearer exists, and sends the downlink data to the UE through the re-established radio bearer.

According to this embodiment, when the S1 bearer is retained and the radio bearer is released, the UE is paged and the radio bearer between the eNB and the UE is re-established, so that the downlink data can be sent to the UE, thereby avoiding data loss.

Figure 8:
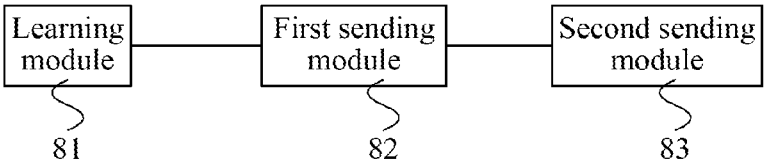
FIG. 8 is a schematic structural diagram of an embodiment of an S-GW according to the present invention.

FIG. 8 is a schematic structural diagram of an embodiment of an S-GW according to the present invention, which includes a learning module 81, a first sending module 82, and a second sending module 83, where the learning module 81 is configured to learn that a radio bearer corresponding to an S1 bearer does not exist, when downlink data is received and the S1 bearer is retained; the first sending module 82 is configured to send a downlink data notification to an MME, when the learning module learns that the radio bearer corresponding to the S1 bearer does not exist, so that the MME sends a paging instruction to the eNB after receiving the downlink data notification, where the paging instruction is used to instruct the eNB to page a UE corresponding to the S1 bearer and re-establish a radio bearer between the eNB and the UE; and the second sending module 83 is configured to send the downlink data to the UE through the S1 bearer and the radio bearer whose re-establishment is triggered by the first sending module.

Optionally, the S-GW may further include a receiving module configured to receive an S1 bearer sleep request sent by the MME, and set the S1 bearer to a sleep state. The S1 bearer sleep request is sent by the MME after the MME receives the S1 bearer sleep request sent by the eNB. The S1 bearer sleep request sent by the eNB is sent by the eNB after the eNB determines that the radio bearer needs to be released. The sleep state refers to that after the downlink data reaches the S-GW, the S1 bearer exists but the downlink data fails to be sent to the eNB, and the sleep state is activated by the MME or is activated after uplink data sent by the eNB is received. The learning module is specifically configured to learn that the radio bearer corresponding to the S1 bearer does not exist, if it is determined that the S1 bearer is in the sleep state after the downlink data is received.

Optionally, the second sending module is specifically configured to receive an activation instruction sent by the MME. The activation instruction is sent by the MME after the MME receives a radio bearer establishing instruction sent by the eNB, where the radio bearer establishing instruction is sent by the eNB after the eNB re-establishes the radio bearer. The second sending module is specifically configured to activate the S1 bearer between the eNB and the S-GW according to the activation instruction; and send the downlink data to the eNB through the activated S1 bearer, and send the downlink data to the UE through the eNB and the re-established radio bearer.

Optionally, the learning module is specifically configured to learn that the radio bearer corresponding to the S1 bearer does not exist, after the downlink data including indication information and returned by the eNB is received, where the indication information is used to indicate that the radio bearer corresponding to the S1 bearer does not exist, and the indication information is added to the returned downlink data after the eNB receives the downlink data sent by the S-GW and determines that the radio bearer does not exist.

Optionally, the S-GW further includes a processing module, configured to, after receiving the indication information, stop sending the downlink data to the eNB but continue to receive uplink data sent by the eNB and put the returned downlink data into a cache queue again according to a packet header indication of the downlink data.

According to this embodiment, when the S1 bearer is retained and the radio bearer is released, the UE is paged and the radio bearer between the eNB and the UE is re-established, so that the downlink data can be sent to the UE, thereby avoiding data loss.

A person of ordinary skill in the art may understand that, all or a part of the steps of the foregoing method embodiments may be implemented by a program instructing relevant hardware. The foregoing program may be stored in a computer readable storage medium. When the program runs, the steps of the forgoing method embodiments are performed. The foregoing storage medium includes various mediums capable of storing program codes, such as a ROM, a RAM, a magnetic disk, or an optical disk.

Finally, it should be noted that the foregoing embodiments are merely intended for describing the technical solutions of the present invention other than limiting the present invention. Although the present invention is described in detail with reference to the foregoing embodiments, a person of ordinary skill in the art should understand that modifications may still be made to the technical solutions described in the foregoing embodiments, or equivalent replacements may still be made to some or all the technical features thereof, without departing from the spirit and scope of the technical solutions of the embodiments of the present invention.

What is claimed is:

1. A downlink data transmission method on a long term evolution (LTE) network, the method comprising:

determining, by a base station, that an S1 bearer between the base station and a serving gateway (S-GW) for a user equipment (UE) is retained and, at the same time, a radio bearer between the base station and the UE has been released, wherein the determining is performed at the base station after receiving downlink data, to be sent to the UE, at a serving gateway (S-GW);

based on the determining, paging, by the base station, the UE and re-establishing a radio bearer between the base station and the UE, wherein the paging the UE comprises:

searching for stored UE context information;

obtaining paging data of the UE from the UE context information [if] *when* the UE context information comprises the paging data of the UE;

obtaining paging data of the UE from a mobility management entity (MME) [if] *when* the UE context information does not comprise the paging data of the UE; and paging the UE according to the paging data; and sending, by the base station, the downlink data, to the UE through the re-established radio bearer.

2. The method according to claim 1, wherein the determining comprises:

after receiving, through the S1 bearer, the downlink data, learning, by the base station, that the UE needs to be paged, if the base station determines that a radio bearer corresponding to the S1 bearer does not exist.

3. The method according to claim 2, before the determining, further comprising:

receiving, through the S1 bearer, the downlink data; and caching the downlink data, wherein the sending, by the base station, downlink data to the UE through the re-established radio bearer comprises sending the cached downlink data to the UE through the re-established radio bearer.

4. The method according to claim 1, wherein the determining comprises:

receiving a paging instruction sent by an MME, wherein the paging instruction is sent by the MME after the MME receives a downlink data notification sent by the S-GW, wherein the downlink data notification is sent by the S-GW when the S-GW receives the downlink data and learns that a radio bearer corresponding to the S1 bearer does not exist.

5. The method according to claim 4, further comprising:

sending an S1 bearer sleep request to the S-GW through the MME when the base station determines that the radio bearer needs to be released.

6. The method according to claim 5, wherein the sending, by the base station, downlink data to the UE through the re-established radio bearer comprises:

sending, by the base station, a radio bearer establishing instruction to the MME after the radio bearer is established, so that the MME activates the S1 bearer between the base station and the S-GW after receiving the radio bearer establishing instruction; and receiving, by the base station through the activated S1 bearer, the downlink data, and sending the downlink data to the UE through the re-established radio bearer.

7. A base station comprising:

a processor;

a non-transitory computer-readable storage medium storing a program to be executed by the processor, the program including instructions for:

determining that an S1 bearer between the base station and a serving gateway (S-GW) for a user equipment (UE) is retained and, at the same time, a radio bearer has been released, wherein the determining is performed after receiving downlink data, to be sent to the UE, at a serving gateway (S-GW), and page the UE and re-establish a radio bearer between the base station and the UE, wherein the instructions for paging the UE comprises instructions for:

searching for stored UE context information;

obtaining paging data of the UE from the UE context information if the UE context information comprises the paging data of the UE;

obtaining paging data of the UE from a mobility management entity (MME) if the UE context information does not comprise the paging data of the UE; and paging the UE according to the paging data;

a receiver configured to receive the downlink data from the serving gateway (S-GW); and a transmitter configured to send the downlink data to the UE through the radio bearer re-established by the processor.

8. The base station according to claim 7, wherein the program further comprises instructions for:

after the downlink data is received from the S-GW through the S1 bearer, learning that the UE needs to be paged if it is determined that a radio bearer corresponding to the S1 bearer does not exist.

9. The base station according to claim 8, wherein the program further comprises instructions for:

caching the downlink data received by the receiver, wherein the transmitter is further configured to send the downlink data cached to the UE through the re-established radio bearer.

10. The base station according to claim 7, wherein the receiver is configured to:

receive a paging instruction sent by an MME, wherein the paging instruction is sent by the MME after the MME receives a downlink data notification sent by the S-GW, and the downlink data notification is sent by the S-GW when the S-GW receives the downlink data and learns that a radio bearer corresponding to the S1 bearer does not exist.

11. The base station according to claim 10, further comprising:

the transmitter is further configured to send an S1 bearer sleep request to the S-GW through the MME when it is determined that the radio bearer needs to be released.

12. The base station according to claim 11, wherein the transmitter is configured to send a radio bearer establishing instruction to the MME after the radio bearer is established for the MME to activate the S1 bearer between the base station and the S-GW after receiving the radio bearer establishing instruction;

the receiver is further configured to receive, through the activated S1 bearer, the downlink data sent by the S-GW; and the program further comprises instructions for control the transmitter to send the downlink data to the UE through the re-established radio bearer.

13. The base station according to claim 10, wherein the program further comprises instructions for:

after the downlink data sent by the S-GW is received through the S1 bearer, adding indication information to the downlink data and control the transmitter to return the downlink data to which the indication information is added to the S-GW, if it is determined that the radio bearer corresponding to the S1 bearer does not exist, wherein the indication information is used to indicate that the radio bearer corresponding to the S1 bearer does not exist, the indication information is used for indicating the S-GW that the radio bearer corresponding to the S1 bearer does not exist.

14. The base station according to claim 13, wherein the transmitter is configured to send a radio bearer establishing instruction to the MME after the radio bearer is established, for the MME to send indication information indicating that the radio bearer is established to the S-GW;

the receiver is further configured to receive, through the S1 bearer, the downlink data sent by the S-GW after the S-GW learns that the radio bearer exists; and

[t] wherein the program further comprises instructions for controlling the transmitter to send the downlink data to the UE through the re-established radio bearer.

15. A serving gateway (S-GW) comprising a processor, a non-transitory computer-readable storage medium storing a program to be executed by the processor, the processor coupled with a transmitter and a receiver, wherein the program includes instructions for:

when downlink data is received, determining that an S1 bearer between a base station and the serving gateway (S-GW) for a user equipment (UE) is retained but a radio bearer corresponding to the S1 bearer does not exist, controlling the transmitter to send a downlink data notification to a mobility management entity (MME), and after the downlink data is received, learning that the radio bearer corresponding to a S1 bearer does not exist, if it is determined that the S1 bearer is in the sleep state;

the transmitter is configured to send the downlink data notification to the MME for the MME to send a paging instruction to a base station after receiving the downlink data notification, wherein the paging instruction is used to instruct the base station to page the UE corresponding to the S1 bearer and re-establish a radio bearer between the base station and the UE; and the transmitter is further configured to send the downlink data to the UE through the S1 bearer and the radio bearer.

16. The S-GW according to claim 15, wherein the receiver is configured to: receive an S1 bearer sleep request from the MME;

the program further includes instructions for: setting the S1 bearer to a sleep state, wherein the S1 bearer sleep request is sent by the MME after the MME receives the S1 bearer sleep request sent by the base station, wherein the S1 bearer sleep request is sent by the base station after the base station determines that the radio bearer needs to be released; and the sleep state refers to that after the downlink data reaches the S-GW, the S1 bearer exists but the downlink data fails to be sent to the base station, and the sleep state is activated by the MME or is activated after uplink data sent by the base station is received.

17. The S-GW according to claim 16, wherein the receiver is configured to:

receive an activation instruction from the MME, wherein the activation instruction is sent by the MME after the MME receives a radio bearer establishing instruction from the base station, wherein the radio bearer establishing instruction is sent by the base station after the base station re-establishes the radio bearer;

the program further includes instructions for activating the S1 bearer between the base station and the S-GW according to the activation instruction received by the receiver; and the transmitter is configured to: send the downlink data to the base station through the activated S1 bearer.

18. The S-GW according to claim 15, wherein the program further includes instructions for:

learning that the radio bearer corresponding to the S1 bearer does not exist, after the downlink data comprising indication information and returned by the base station is received by the receiver, wherein the indication information is used to indicate that the radio bearer corresponding to the S1 bearer does not exist, and the indication information is added to the returned downlink data after the base station receives the downlink data sent by the S-GW and determines that the radio bearer does not exist.

*19. A method comprising:*

*after receiving, from a serving gateway (S-GW), downlink data for a user equipment (UE), determining, by a base station, that an S1 bearer between the base station and the S-GW for the UE is retained and, at the same time, a first radio bearer between the base station and the UE has been released;*

*searching for stored UE context information;*

*obtaining, by the base station, paging data of the UE from UE context information stored in the base station in response to determining that the UE context information comprises the paging data of the UE;*

*obtaining paging data of the UE from a mobility management entity in response to determining that the UE context information does not comprise the paging data of the UE; and*

*paging, by the base station, the UE according to the paging data to re-establish a second radio bearer between the base station and the UE; and*

*sending, by the base station, the downlink data, to the UE through the second radio bearer.*

*20. The method according to claim 19, wherein the downlink data is received through the S1 bearer, the determining comprises:*

*determining, by the base station, that the first radio bearer corresponding to the S1 bearer does not exist.*

*21. The method according to claim 20, before the determining, further comprising:*

*caching the downlink data, wherein sending the downlink data through the second radio bearer comprises sending the cached downlink data to the UE through the second radio bearer.*

*22. An apparatus comprising:*

*a processor;*

*a non-transitory computer-readable storage medium storing a program to be executed by the processor, the program including instructions for:*

*determining that an S1 bearer for a user equipment (UE) is retained and, at the same time, a first radio bearer between a base station and the UE has been released after downlink data for a user equipment (UE),*

*searching for stored UE context information;*

*obtaining paging data of the UE from stored UE context information in response to determining that the UE context information comprises the paging data of the UE; and*

*obtaining paging data of the UE from a mobility management entity in response to determining that the UE context information does not comprise the paging data of the UE;*

*paging the UE according to the paging data to re-establish a second radio bearer between the base station and the UE; and*

*sending the downlink data to the UE through the second radio bearer.*

*23. The apparatus according to claim 22, wherein the downlink data is received through the S1 bearer, the determining comprises:*

*determining that the first radio bearer corresponding to the S1 bearer does not exist.*

*24. The apparatus according to claim 23, the program further including instructions for: before the determining, caching the downlink data, wherein the sending downlink data to the UE through the second radio bearer comprises sending the cached downlink data to the UE through the second radio bearer.*

*25. A communication system comprising:*

*a base station; and*

*a serving gateway (S-GW) configured to send downlink data for user equipment (UE) to the base station through an S1 bearer;*

*wherein the base station comprises a processor and a non-transitory computer-readable storage medium storing a program to be executed by the processor, the program including instructions for:*

*receiving the downlink data from the S-GW through the S1 bearer;*

*determining that a first radio bearer corresponding to the S1 bearer for a user equipment (UE) does not exist;*

*searching for stored UE context information;*

*obtaining paging data of the UE from stored UE context information in response to determining that the UE context information comprises the paging data of the UE;*

*obtaining paging data of the UE from a mobility management entity in response to determining that the UE context information does not comprise the paging data of the UE;*

*paging the UE according to the paging data to re-establish a second radio bearer between the base station and the UE; and*

*sending the downlink data to the UE through the second radio bearer.*

* * * * *